United States Patent
Asahara et al.

(10) Patent No.: US 8,584,820 B2
(45) Date of Patent: Nov. 19, 2013

(54) VIBRATION REDUCING DEVICE AND VIBRATION REDUCING METHOD

(75) Inventors: Yasuyuki Asahara, Yokohama (JP); Kazuto Sato, Yokohama (JP); Yusuke Sato, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1002 days.

(21) Appl. No.: 11/976,401

(22) Filed: Oct. 24, 2007

(65) Prior Publication Data

US 2008/0134787 A1 Jun. 12, 2008

(30) Foreign Application Priority Data

Oct. 31, 2006 (JP) .................. 2006-295457
Jul. 30, 2007 (JP) .................. 2007-197384

(51) Int. Cl.
*F16F 7/10* (2006.01)

(52) U.S. Cl.
USPC ............................................. 188/378

(58) Field of Classification Search
USPC ................. 188/378–380; 702/41–42
See application file for complete search history.

(56) References Cited

U.S. PATENT DOCUMENTS

| | | | |
|---|---|---|---|
| 4,083,433 A | | 4/1978 | Geohegan, Jr. et al. |
| 5,823,307 A | * | 10/1998 | Schubert et al. ............ 188/378 |
| 6,296,093 B1 | * | 10/2001 | Norris et al. ................ 188/378 |
| 6,328,019 B1 | * | 12/2001 | Janker ......................... 123/498 |
| 2004/0084267 A1 | * | 5/2004 | Allaei .......................... 188/378 |
| 2004/0189153 A1 | * | 9/2004 | Thanner et al. .............. 310/360 |
| 2006/0151272 A1 | * | 7/2006 | Smith et al. .................. 188/378 |

FOREIGN PATENT DOCUMENTS

| | | |
|---|---|---|
| EP | 1 253 346 A1 | 10/2002 |
| EP | 1 591 857 A2 | 11/2005 |
| GB | 2 406 369 A | 3/2005 |
| JP | 2002-79178 | 3/2002 |
| JP | 2003-526800 | 9/2003 |

* cited by examiner

*Primary Examiner* — Anna Momper
(74) *Attorney, Agent, or Firm* — Drinker Biddle & Reath LLP

(57) ABSTRACT

A vibration reducing device, including an inertial mass actuator adapted to be mounted on a vibration damping object, that applies a vibration damping force on the vibration damping object, the vibration damping force being a reactive force generated due to displacement of an inertial mass. A vibration state detector detects the vibration state of the inertial mass. A controller is connected to the inertial mass actuator and vibration state detector. The controller determines the displacement and velocity of the vibration damping object at a part where the inertial mass actuator is mounted, and the displacement and velocity of the inertial mass, based on the vibration state of the inertial mass. The vibration damping force is controlled based on the determined displacement and velocity of the vibration damping object at the part where the inertial mass actuator is mounted, and the displacement and velocity of the inertial mass.

13 Claims, 16 Drawing Sheets x : DISPLACEMENT OF INERTIAL MASS
$x_0$ : DISPLACEMENT OF ATTACHMENT POINT
u : CONTROL FORCE OF FORCE GENERATING ELEMENT
A : PIEZOELECTRIC CONSTANT
V : DRIVING VOLTAGE OF FORCE GENERATING ELEMENT

VIBRATION REDUCING DEVICE AND VIBRATION REDUCING METHOD

CROSS-REFERENCE TO RELATED APPLICATIONS

This application claims priority under 35 U.S.C. §119, to Japanese Patent Application No. 2006-295457 filed on Oct. 31, 2006, and Japanese Patent Application No. 2007-197384 filed on Jul. 30, 2007, the disclosures of which are incorporated by reference herein in the entirety.

BACKGROUND OF THE INVENTION

1. Field of the Invention

This invention relates to a device that is mounted on a vibration damping object and that reduces vibration by an inertial mass actuator having an inertial mass on a side opposite from a mounting surface.

2. Description of Related Art

A related art actuator makes use of the reaction to the force applied to an inertial mass to reduce the vibration of the object. The actuator uses a permanent magnet attached via an elastic member as the inertial mass. An electromagnetic force generated by the permanent magnet and an electromagnetic coil acts on the permanent magnet. The actuator also has a sensor for detecting the force transmitted from the elastic member that supports the permanent magnet, and a sensor for detecting the velocity at the attachment point of the actuator. The actuator reduces vibration of the object based on the signals of the sensors.

However, the related art actuator requires a space for attaching the velocity detecting sensor at the attachment point, so that the size cannot be reduced. Here, for example, when the velocity at a nearby site instead of at the attachment point is detected, the frequency characteristics may be different in the high frequency bandwidth due to the difference in detecting position. In such cases vibration may be dissipated as the gain is raised due to control.

BRIEF SUMMARY OF THE INVENTION

In addition to sensing the velocity at the attachment point, it is also necessary to detect the transmission force transmitted from the elastic member supporting the permanent magnet by a sensor. As a result, many sensors are needed.

An object of the present invention is to solve the aforementioned problems of the related art by providing a vibration reducing device that does not need many sensors, can be miniaturized, and allows attachment even in a narrow space.

In an embodiment, the invention provides a vibration reducing device, including an inertial mass actuator adapted to be mounted on a vibration damping object, that applies a vibration damping force on the vibration damping object, the vibration damping force being a reactive force generated due to displacement of an inertial mass. A vibration state detector detects the vibration state of the inertial mass. A controller is connected to the inertial mass actuator and vibration state detector. The controller determines the displacement and velocity of the vibration damping object at a part where the inertial mass actuator is mounted, and the displacement and velocity of the inertial mass, based on the vibration state of the inertial mass. The vibration damping force is controlled based on the determined displacement and velocity of the vibration damping object at the part where the inertial mass actuator is mounted, and the displacement and velocity of the inertial mass.

In another embodiment, the invention provides a method of reducing vibration of a vibration damping object, including applying a vibration damping force on the vibration damping object with an inertial mass actuator, the vibration damping force being a reactive force generated due to displacement of an inertial mass; detecting a vibration state of the inertial mass; determining the displacement and velocity of the vibration damping object at a part where the inertial mass actuator is mounted to the vibration damping object, and the displacement and velocity of the inertial mass, based on the vibration state of the inertial mass; and controlling the vibration damping force based on the determined displacement and velocity of the vibration damping object at the part where the inertial mass actuator is mounted, and the displacement and velocity of the inertial mass.

According to the present invention, the vibration state of the inertial mass is detected, and the displacement and velocity of the mounting surface of the inertial mass actuator, and the displacement and velocity of the inertial mass, are determined based on the detected value. The vibration application force generated by the inertial mass actuator is controlled based on the values determined. As a result, the number of sensors can be reduced, miniaturization can be realized, and there is no need for attachment space.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DETAILED DESCRIPTION OF THE PREFERRED EMBODIMENTS

Embodiment 1

Figure 1:
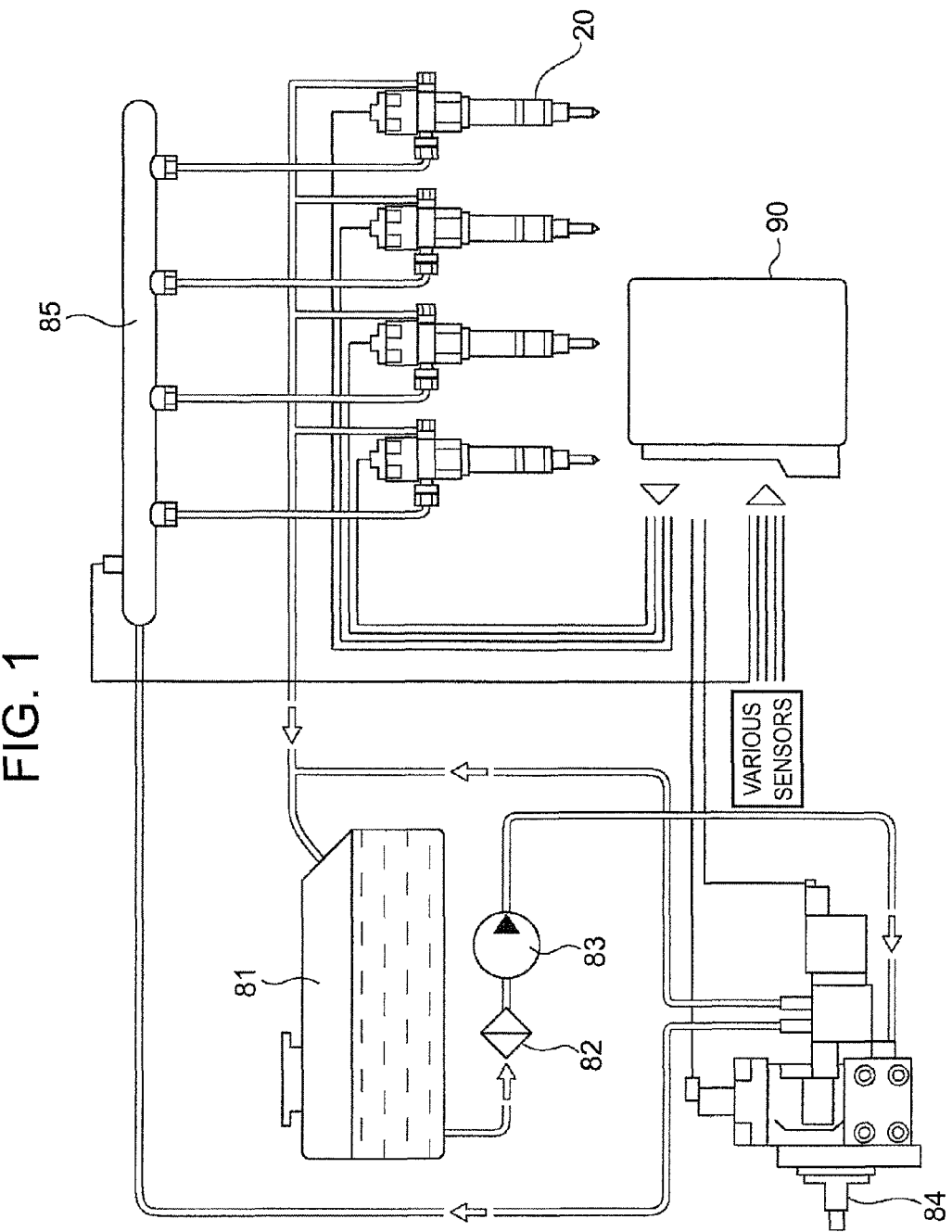
FIG. 1 is a diagram illustrating the state when the vibration reducing device according to an embodiment of the present invention is adopted for a fuel supply system.

FIG. 1 is a diagram illustrating the vibration reducing device of the present invention in a fuel supply system. This fuel supply system is used in the common rail type of automotive diesel engine. Fuel in fuel tank 81 is pumped out by low pressure pump 83 via filter 82, and is pressurized to a high pressure state by high pressure supply pump 84 and supplied to common rail 85. High pressure supply pump 84 contains a pressure regulator. As a result, excess fuel is returned to fuel tank 81, and the pressure in common rail 85 is controlled to a prescribed level. High pressure fuel is fed from common rail 85 to each fuel injector 20, and when the valve of fuel injector 20 is driven to open, fuel is directly sprayed into each cylinder of the diesel engine.

The operation of fuel injectors 20 is controlled by controller 90. Controller 90 computes the fuel injection time and fuel injection quantity based on the engine load (i.e. the amount of accelerator pedal travel or the like) and the engine speed, and outputs corresponding valve-opening instruction signals to the fuel injectors 20. Also, based on the engine load and the engine speed, controller 90 computes the fuel injection pressure, and controls the pressure regulator of high pressure supply pump 84 so that the fuel pressure in common rail 85 matches the computed fuel injection pressure. Here, controller 90 includes a microcomputer with a central processing unit (CPU), read-only memory (ROM), random access memory (RAM) and input/output interface (I/O interface). Controller 90 may also be composed of plural microcomputers.

Figure 2:
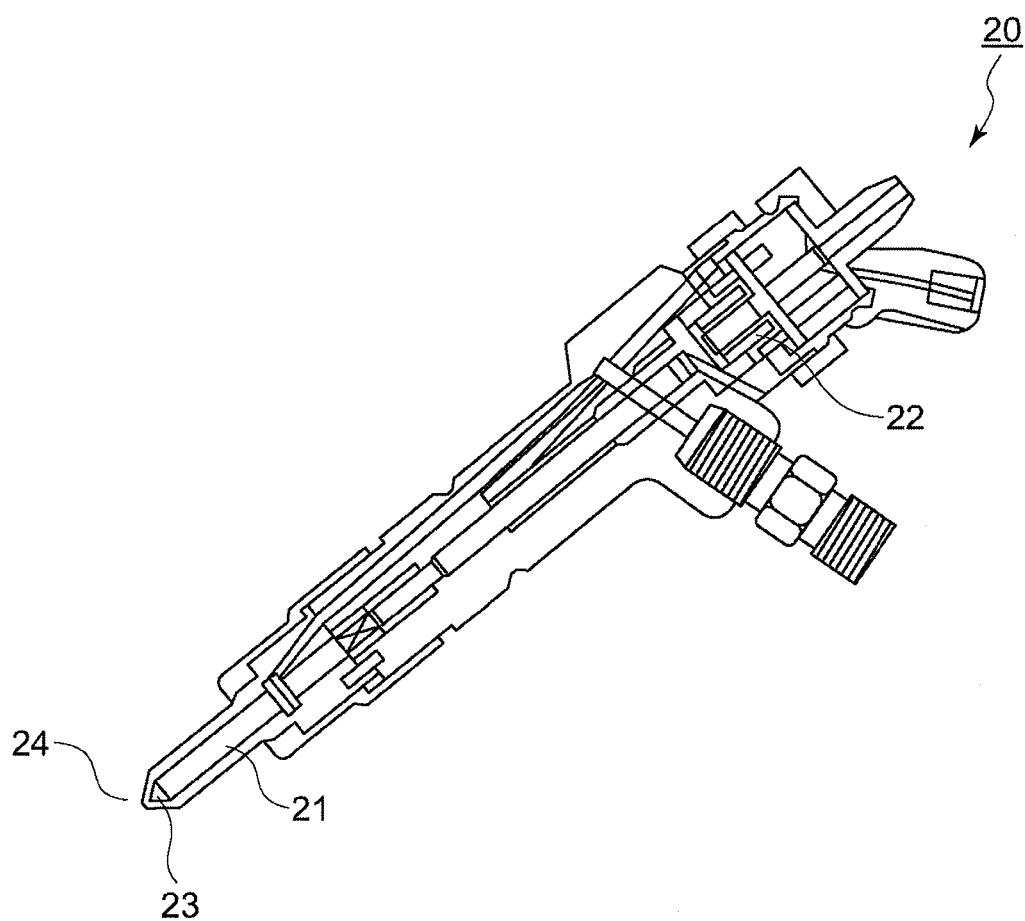
FIG. 2 is a diagram illustrating the structure of a fuel injector.

According to the present embodiment, the vibration of each fuel injector can be reduced. The cause of fuel injector vibration is explained as follows. FIG. 2 is a diagram illustrating the structure of the fuel injector. In fuel injector 20, a combustion pressure chamber is arranged above needle valve 21, and a fuel injection chamber is arranged below it. When electromagnetic valve 22 of fuel injector 20 is closed, needle valve 21 is pressed against seat 23 by the pressure of fuel injector 20 in the combustion pressure chamber, so that no fuel is sprayed. Then, electromagnetic valve 22 is opened by a control instruction from the controller so that the combustion pressure chamber is opened, and the pressure in the combustion pressure chamber falls. As a result, needle valve 21 is driven to move upward by the pressure in the fuel injection chamber so that injection hole 24 is opened, and the fuel is sprayed out. Then, electromagnetic valve 22 of fuel injector 20 is closed by a control instruction from the controller, so that the pressure in the combustion pressure chamber recovers and needle valve 21 is driven to move downward. As a result, needle valve 21 is seated on seat 23, and fuel injection comes to an end.

The collisions of needle valve 21 with seat 23 cause vibrations. In particular, the fuel pressure is very high in a fuel injection system using a common rail, so that high impact forces occur, and fuel injector 20 experiences serious vibrations.

Figure 3:
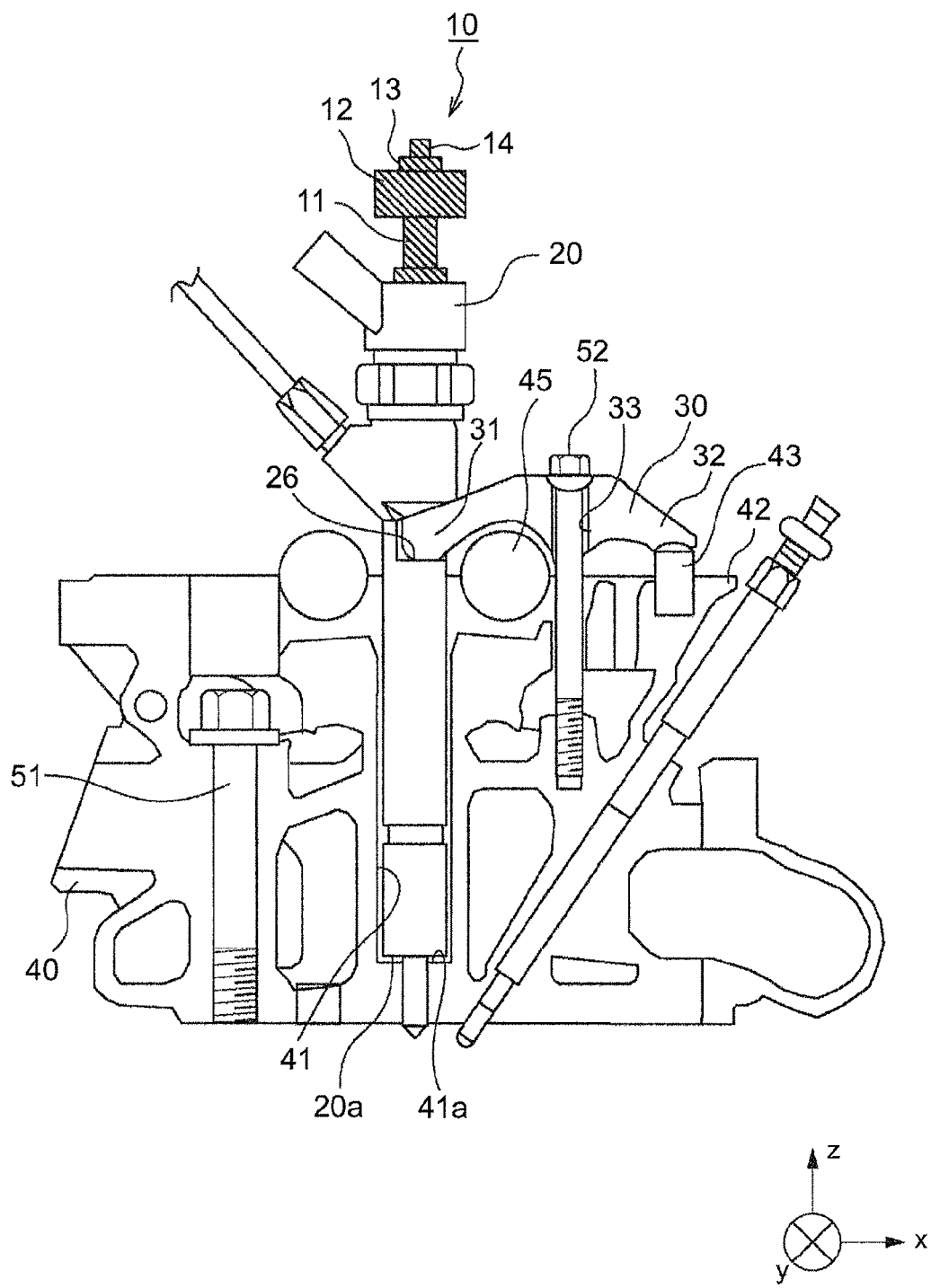
FIG. 3 is a cross section illustrating the cylinder head where fuel injectors are attached, as seen from in front of the engine (in the direction of the crankshaft)

FIG. 3 is a cross section of a cylinder head 40 having fuel injector 20 mounted on it as seen from ahead of the engine i.e. (in the direction of the crankshaft). Here, cylinder head 40 is fixed to the cylinder block by head bolt 51. The cylinder block is not shown in FIG. 3, however.

Fuel injector 20 is inserted and fixed in fuel injector mounting hole 41 formed in cylinder head 40, and is pressed onto cylinder head 40 and secured there by nozzle support 30.

A bolt through hole 33 is formed in nozzle support 30. At one end of nozzle support 30, a two-pronged fork 31 is formed at the tip that straddles camshaft 45. The two-pronged fork 31 contacts pressure receiving part 26 of fuel injector 20. The other end 32 of nozzle support 30 contacts pivot pin 43 embedded in cylinder head 40 near side wall 42, and can rock (i.e. incline) freely. Bolt 52 is inserted in bolt through hole 33 of nozzle support 30, and when it is fastened to cylinder head 40, the axial force of bolt 52 presses fuel injector 20 onto cylinder head 40.

Here, because fuel injector 20 is attached to cylinder head 40, the vibration generated in the fuel injector is transmitted from lower surface 20a of fuel injector 20 via cylinder head seat surface 41a to cylinder head 40, and at the same time the vibration is transferred via pressure receiving portion 26 to nozzle support 30, and then via pivot pin 43 and bolt 52 to cylinder head 40. The vibration is then further transmitted to the cylinder block, head cover, etc., generating noises.

Here, according to the present invention, actuator 10 includes a piezoelectric element used to reduce the noise. The inertial mass actuator 10 is attached on the upper end of fuel injector 20. Inertial mass actuator 10 is controlled by controller 90. The specific constitution of inertial mass actuator 10 will be explained later.

The vibration acceleration signal (representing the vibration state of the inertial mass) of acceleration sensor 14, which detects the acceleration in the axial direction (i.e. z-direction in FIG. 3) of inertial mass 12 and is integrally attached to inertial mass 12, is input to controller 90, and inertial mass actuator 10 is controlled based on the signal.

When vibration of vibration damping object 20 is detected by vibration state detector 14, feedback control is initiated. Also, when there are plural cylinders, fuel injector inertial mass actuators corresponding in number to the number of cylinders are adopted.

In this way, by reducing the vibration of fuel injector 20, vibration excited in the cylinder block, head cover, etc. via cylinder head 40 is also reduced. As a result, noise can be reduced.

Figure 4:
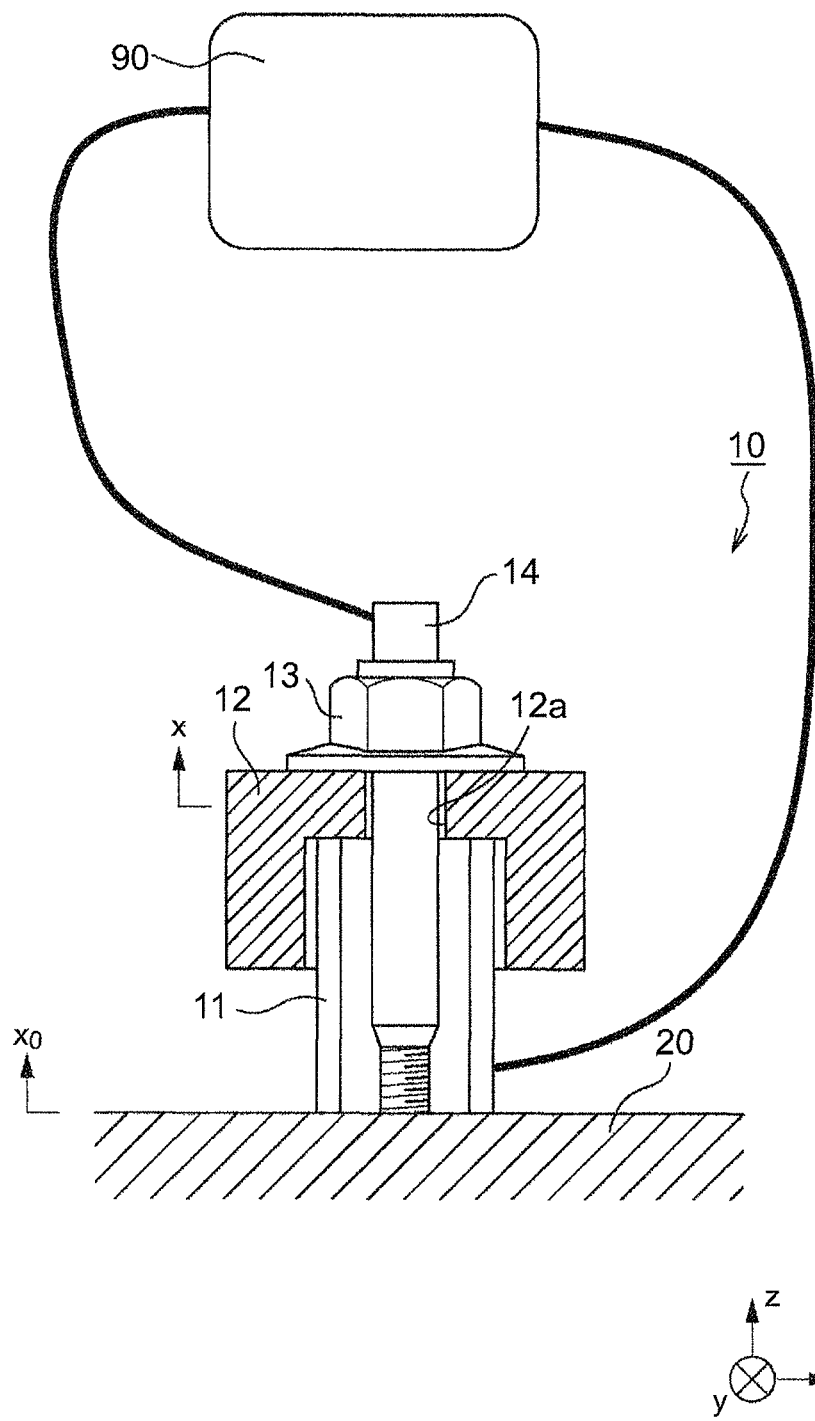
FIG. 4 is a diagram illustrating the inertial mass actuator.

FIG. 4 is a diagram illustrating the inertial mass actuator. Inertial mass actuator 10 includes piezoelectric element 11 as the force generating element, inertial mass 12, and fastening bolt 13.

Piezoelectric element 11 is prepared, for example, by laminating thin sheet-shaped piezoelectric elements, and serves as a vibration damping force generating device that generates an elongating force in the axial direction (i.e. z-direction in FIG. 4) corresponding to an applied voltage. In the present embodiment, piezoelectric element 11 is cylindrical. The piezoelectric element is polarized so that when a voltage is applied, an internal force is generated causing elongation in the z-direction that is nearly proportional to the applied voltage within the range of the applied voltage. That is, the piezoelectric element serves as a vibration damping force generating device that generates an elongating force in the axial direction (z-direction in FIG. 4) corresponding to the applied voltage. The force applied to fuel injector 20 by the piezoelectric element is a product of the vibrational acceleration of inertial mass 12 and the mass of inertial mass 12.

Inertial mass 12 is mounted on piezoelectric element 11. Inertial mass 12 has a cylindrical shape with a cap, and hole 12a is formed in the cap. Inertial mass 12 surrounds an upper portion of piezoelectric element 11. Fastening bolt 13 is inserted in hole 12a of inertial mass 12, and then through cylindrical piezoelectric element 11, and screwed into fuel injector 20. Fastening bolt 13 screws piezoelectric element 11 and inertial mass 12 to fuel injector 20. Acceleration sensor 14 is attached at the upper end of fastening bolt 13. When fastening bolt 13 elongates corresponding to displacement of the inertial mass, that is, elongation of the piezoelectric element, acceleration sensor 14 detects the vibration acceleration in the axial direction (i.e. z-direction in FIG. 4).

In this manner, inertial mass actuator 10 performs vibration damping for fuel injector 20, with the reaction force to the vibration force applied to inertial mass 12 by piezoelectric element 11 acting as the vibration damping force.

Figure 5:
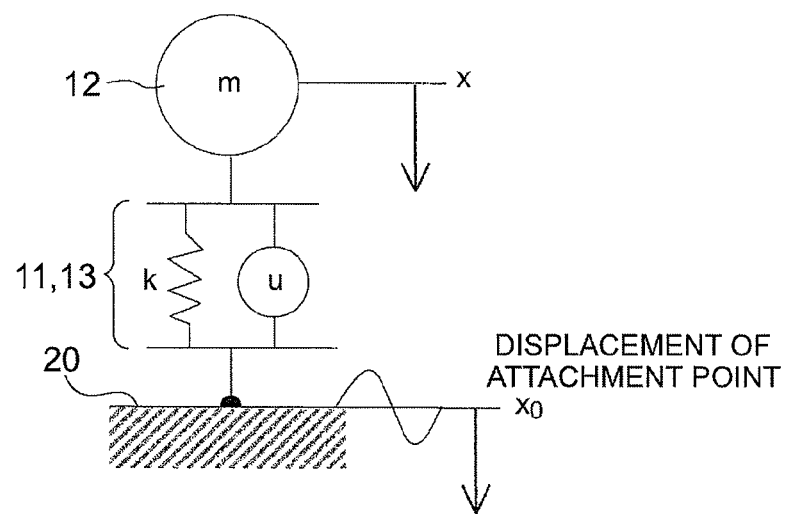
FIG. 5 is a diagram illustrating the model of the inertial mass actuator.

FIG. 5 is a diagram illustrating a model of the inertial mass actuator. Here, the model of the inertial mass actuator can be formed as a vibration system with a single degree of freedom, with forced displacement received at the attachment point, and represented by the following kinetic equations (1-1), (1-2).

$$m\ddot{x} + c\dot{x} + kx = u + w \tag{1-1}$$

$$c\dot{x} + kx_0 + w \tag{1-2}$$

where,
m: mass of inertial mass
c: damping constant of actuator containing fastening bolt
k: spring constant of actuator containing fastening bolt
x: displacement of inertial mass
$x_0$: displacement at attachment point
u: control force of actuator
w: external disturbance When converted to the state space representation with inertial mass acceleration as output, the model can be represented using the following equations (2-1), (2-2).

$$\begin{bmatrix} \dot{x} \\ \dot{x} \\ \dot{x}_0 \end{bmatrix} = \begin{bmatrix} -\frac{c}{m} & -\frac{k}{m} & 0 \\ 1 & 0 & 0 \\ 0 & 0 & -\frac{k}{c} \end{bmatrix} \begin{bmatrix} \dot{x} \\ x \\ x_0 \end{bmatrix} + \begin{bmatrix} \frac{1}{m} \\ 0 \\ 0 \end{bmatrix} u + \begin{bmatrix} \frac{1}{m} \\ 0 \\ \frac{1}{c} \end{bmatrix} w \tag{2-1}$$

$$[\ddot{x}] = \begin{bmatrix} -\frac{c}{m} & -\frac{k}{m} & 0 \end{bmatrix} \begin{bmatrix} \dot{x} \\ x \\ x_0 \end{bmatrix} + \begin{bmatrix} \frac{1}{m} \end{bmatrix} u + \begin{bmatrix} \frac{1}{m} \end{bmatrix} w + v \tag{2-2}$$

where,
w: external disturbance (system noise)
v: observation noise

As can be seen from these equations, it is possible to form the observer for determining the velocity of the inertial mass, the displacement of the inertial mass, and the displacement of the attachment point from the acceleration of the inertial mass and the actuator control force. In addition, it is also possible to determine the velocity of the attachment point of primary differentiation of the displacement of the determined attachment point.

Here, w and v are normal white noises independently having a normal distribution. For both, the mean value and covariance are known, and are given by the following equations (3-1), (3-2), (3-3), (3-4).

$$E[w] = 0 \tag{3-1}$$

$$E[w(t)w^T(\tau)] = W(t)\delta(t-\tau) \tag{3-2}$$

$$E[v] = 0 \tag{3-3}$$

$$E[v(t)v^T(\tau)] = V(t)\delta(t-96) \tag{3-4}$$

where,
$\delta(t)$: Dirac delta function, and $$\begin{cases} \delta = 1 (t = \tau) \\ \delta = 0 (t \neq \tau) \end{cases}$$

$E[\cdot]$: mathematical expected value

The Karman filter equations include the following equations (4-1), (4-2).

$$\begin{bmatrix} \ddot{\hat{x}} \\ \dot{\hat{x}} \\ \dot{\hat{x}}_0 \end{bmatrix} = \begin{bmatrix} -\frac{c}{m} & -\frac{k}{m} & 0 \\ 1 & 0 & 0 \\ 0 & 0 & -\frac{k}{c} \end{bmatrix} \begin{bmatrix} \dot{\hat{x}} \\ \hat{x} \\ \hat{x}_0 \end{bmatrix} + \begin{bmatrix} \frac{1}{m} \\ 0 \\ 0 \end{bmatrix} u + K\left(\ddot{x} - \begin{bmatrix} -\frac{c}{m} & -\frac{k}{m} & 0 \end{bmatrix} \begin{bmatrix} \ddot{\hat{x}} \\ \hat{x} \\ \hat{x}_0 \end{bmatrix}\right) \tag{4-1}$$

$$\dot{\hat{x}}_0 = S\hat{x}_0 \tag{4-2}$$

where, S indicates differentiation.

In this way, for the Karman filter having the acceleration of the inertial mass $\ddot{x}$ and control force u of the force generating element (i.e. piezoelectric element) as inputs, as outputs of primary differentiation one gets the inertial mass velocity $\dot{\hat{x}}$, inertial mass displacement $\hat{x}$, velocity of the attachment point $\dot{\hat{x}}_0$, and displacement of the attachment point $\hat{x}$.

The Karman filter gain is represented by following Equation (5).

$$K = \overline{X} \begin{bmatrix} -\frac{c}{m} & -\frac{k}{m} & 0 \end{bmatrix}^T V^{-1} \tag{5}$$

where, $\overline{X}$ can be obtained as the positive, definite symmetric solution of the Riccati equation shown as Equation (6).

$$\begin{bmatrix} -\frac{c}{m} & -\frac{k}{m} & 0 \\ 1 & 0 & 0 \\ 0 & 0 & -\frac{k}{c} \end{bmatrix} \overline{X} + \overline{X} \begin{bmatrix} -\frac{c}{m} & -\frac{k}{m} & 0 \\ 1 & 0 & 0 \\ 0 & 0 & -\frac{k}{c} \end{bmatrix}^T - \tag{6}$$

-continued $$\bar{X}\begin{bmatrix} -\dfrac{c}{m} & -\dfrac{k}{m} & 0 \end{bmatrix}^T V^{-1} \begin{bmatrix} -\dfrac{c}{m} & -\dfrac{k}{m} & 0 \end{bmatrix} \bar{X} + \begin{bmatrix} \dfrac{1}{m} \\ 0 \\ \dfrac{1}{c} \end{bmatrix} W \begin{bmatrix} \dfrac{1}{m} \\ 0 \\ \dfrac{1}{c} \end{bmatrix}^T = 0$$

$\bar{X}$: positive, definite symmetric solution of the Riccati Equation (error covariation matrix).

In this embodiment, as shown in the following Equation (7), the point velocity is multiplied by gain G1, and for $u_v$ of opposite sign is input to the injector as the control object, so that the resonance peak of the injector vibration is reduced.

$$u_v = -G_1 \dot{x}_0 \qquad (7)$$

Here, with respect to input $u_v$ to the injector as the control object, control force u is represented by following Equation (8).

$$u = c(\dot{x} - \dot{x}_0) + k(x - x_0) - u_v \qquad (8)$$

Voltage V that is actually applied to driving force generating element 11 is represented by the following Equation (9).

$$V = \dfrac{l}{A} u \qquad (9)$$

where,
V: force generating element driving voltage
A: piezoelectric constant (force conversion coefficient)

Figure 6:
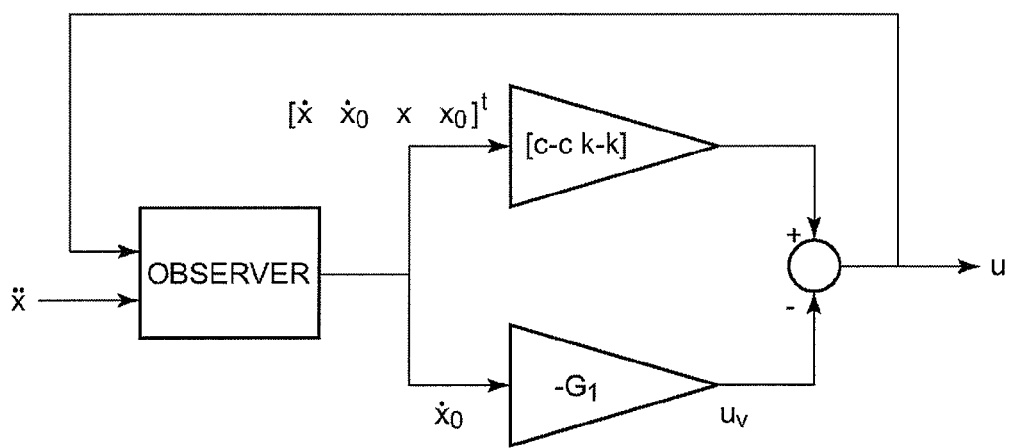
FIG. 6 is a block diagram illustrating control of Embodiment 1 of the vibration reducing device of the present invention.

Here, as shown in FIG. 6, Equation (8) is adopted to determine control force u by using input $u_v$ to the injector, determined by substituting the velocity of the attachment point determined by the observer based on the acceleration of the inertial mass detected with acceleration sensor 14 in Equation (7), the velocity of the inertial mass determined by the observer, the velocity of the attachment point, the displacement of the inertial mass, and the displacement of the attachment point. Here, said control force u is generated by the actuator.

Figure 7:
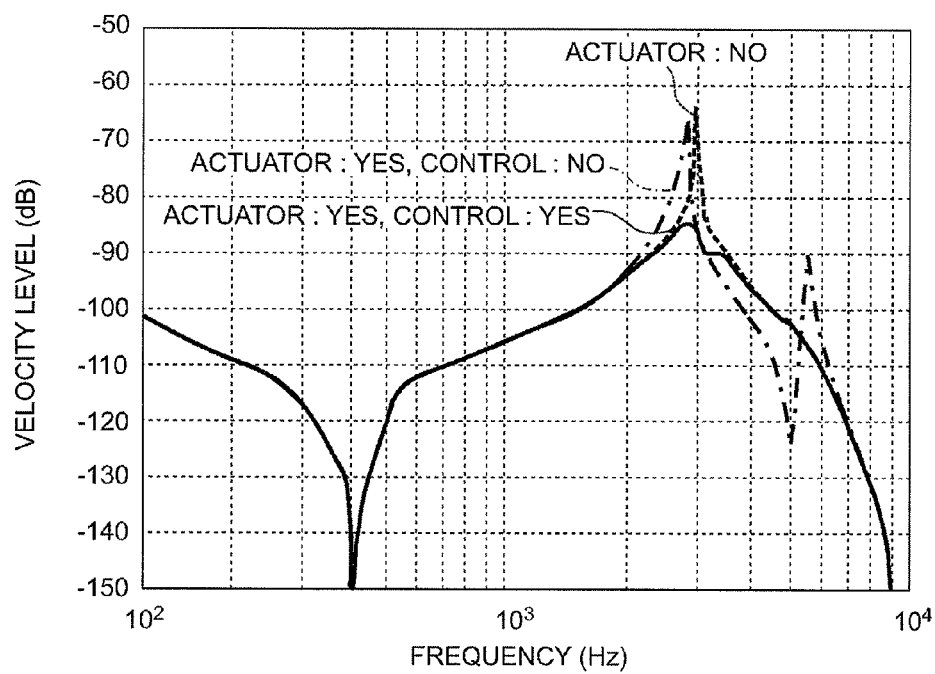
FIG. 7 is a diagram illustrating the vibration reduction effect.

By performing the aforementioned control, it is possible to realize a significant vibration reducing effect of the principal resonance frequency of vibration of the injector at about 3 kHz, as shown in FIG. 7.

Also, as indicated by the dot-dash line in FIG. 7, when the inertial mass actuator is attached to a fuel injector and no control is performed, while the resonance frequency of the fuel injector falls, the vibration is exacerbated due to resonance of the inertial mass. On the other hand, when control is performed as in the present embodiment, the force transmitted to the fuel injector becomes only the force corresponding to the damping force proportional to the velocity, so that there is no influence of the inertial mass actuator on the vibration system, and a decrease in the resonance frequency of the fuel injector and resonance of the inertial mass do not take place.

In this way, according to the present embodiment there is no effect on the resonance frequency when the inertial mass actuator is not attached. As a result, there is no need to perform re-tuning even for a dynamic vibration absorber, or the like, that is tuned together with the resonance frequency.

Also, because the state quantities are determined using an observer, it is possible to effect control using only one sensor. Also, as the order of the observer is as low as $3^{rd}$ order, the load on the CPU of the controller is also low.

The physical quantity (i.e. vibration acceleration of the inertial mass) indicating the vibration state of the inertial mass actuator is measured, and based on this the displacement and velocity of the mounting surface of the inertial mass actuator, and the displacement and velocity of the inertial mass, are determined. The control force generated from the actuator is determined based on these. As a result, it is possible to obtain the information needed for control using fewer sensors. Also, because there is no need to detect the vibration of the actuator attachment point, no variation in vibration due to the difference in detecting position takes place, and a significant vibration reducing effect can be realized.

Also, because the vibration application force is controlled such that there is a component proportional to the relative displacement of the inertial mass actuator mounting surface and of the inertial mass, and to the relative velocity of the inertial mass actuator mounting surface and of the inertial mass, it is possible to obtain the necessary actuator control force required for applying the desired force to the control object.

In addition, because the vibration application force is controlled such that it has a component proportional to the velocity of the inertial mass actuator mounting surface, it is possible to realize the effect of applying damping to the control object (e.g. fuel injector), and the vibration reduction effect can be obtained.

Embodiment 2

Figure 8:
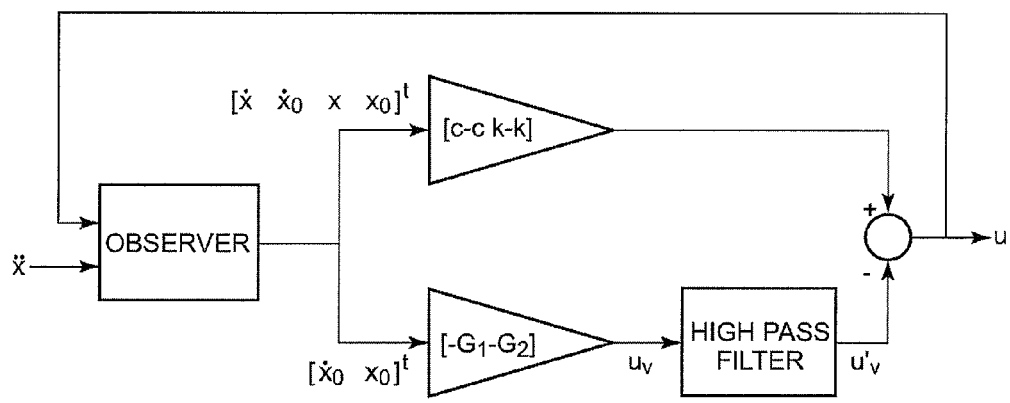
FIG. 8 is a block diagram illustrating control in Embodiment 2 of the vibration reducing device of the present invention.

FIG. 8 is a block diagram illustrating control in Embodiment 2 of the vibration reducing device in the present invention. In the following, the same part numbers as those adopted in the aforementioned embodiment will be adopted, and they will not be explained again.

In Embodiment 1, input $u_v$ to the fuel injector contains a force proportional to the velocity of the attachment point. On the other hand, in the present embodiment, input $u_v$ to the fuel injector incorporates not only the velocity of the attachment point, but also a force proportional to the displacement of the attachment point. That is, in the present embodiment, input $u_v$ to the fuel injector is given by the following Equation (10).

$$u_v = -G_1 \dot{x}_0 - G_2 x_0 \qquad (10)$$

Here, especially when a force proportional to the displacement is applied, the displacement of the inertial mass becomes greater under the influence of the low frequency component, and it may exceed the displacement limit of the actuator and make control impossible. Consequently, in the present embodiment, a high-pass filter is provided to cut the low frequency component (e.g. 50 Hz or lower in the present embodiment) in $u_v$, and when the result is taken as force $u'_v$ input to the fuel injector, the following Equation (11) is used to determine control force u applied to the actuator.

$$u = c(\dot{x} - \dot{x}_0) + k(x - x_0) - u'_v \qquad (11)$$

Figure 9:
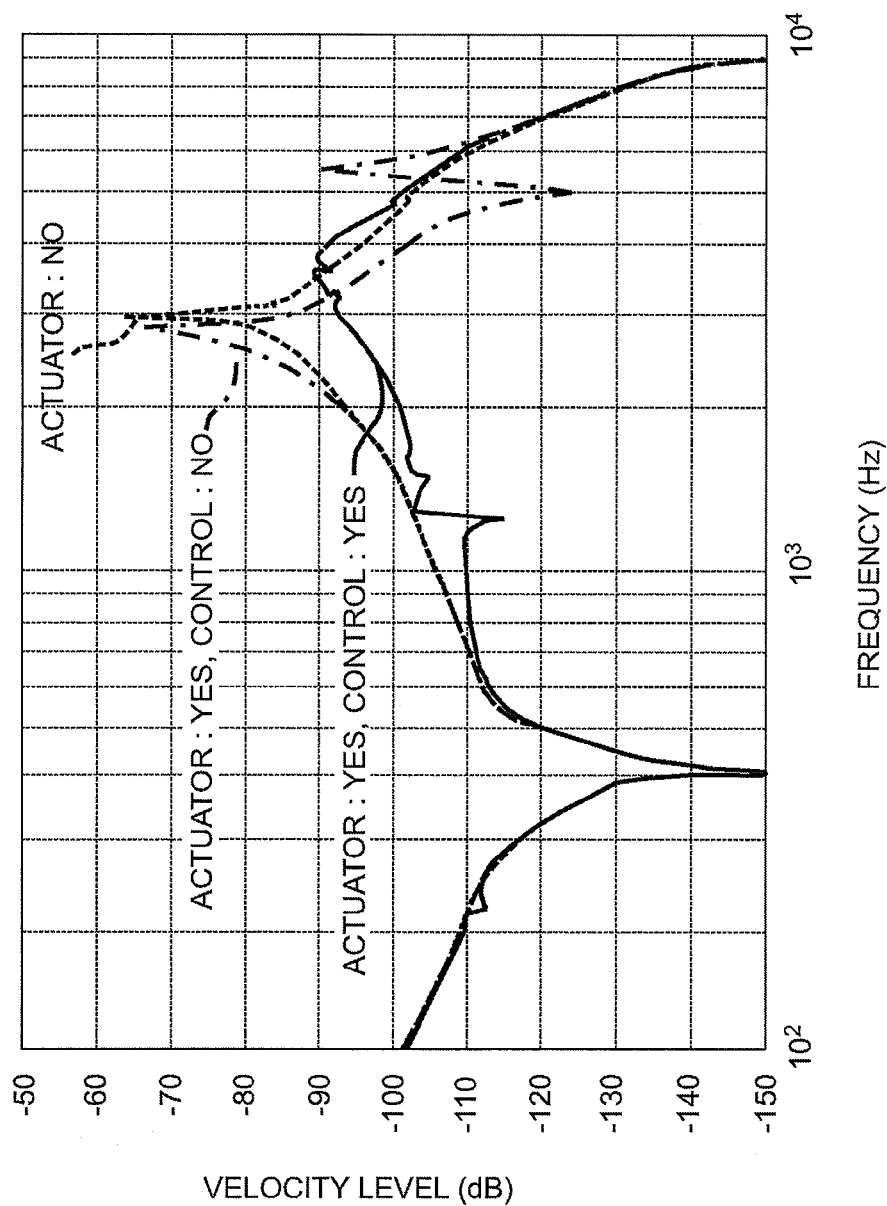
FIG. 9 is a diagram illustrating the results of control.

FIG. 9 is a diagram illustrating the results obtained by this control. According to the present embodiment, in addition to the effect of reducing vibration at the resonance frequency due to the application of damping, an effect of increasing rigidity is also realized, and as shown in FIG. 9, the effect of reducing vibration at frequencies below resonance is obtained.

Because the vibration application force is controlled such that it has a component proportional to the displacement of the inertial mass actuator mounting surface, an effect of imparting rigidity to the control object (e.g. fuel injector) is obtained, and a significant vibration reducing effect is realized.

Also, because a high-pass filter is used to cut the low frequency component below a prescribed frequency in the component proportional to the velocity of the inertial mass actuator mounting surface and in the component proportional to the displacement, it is possible to avoid the problem that the added mass displacement due to the low frequency component becomes too large to perform control.

Embodiment 3

Figure 10:
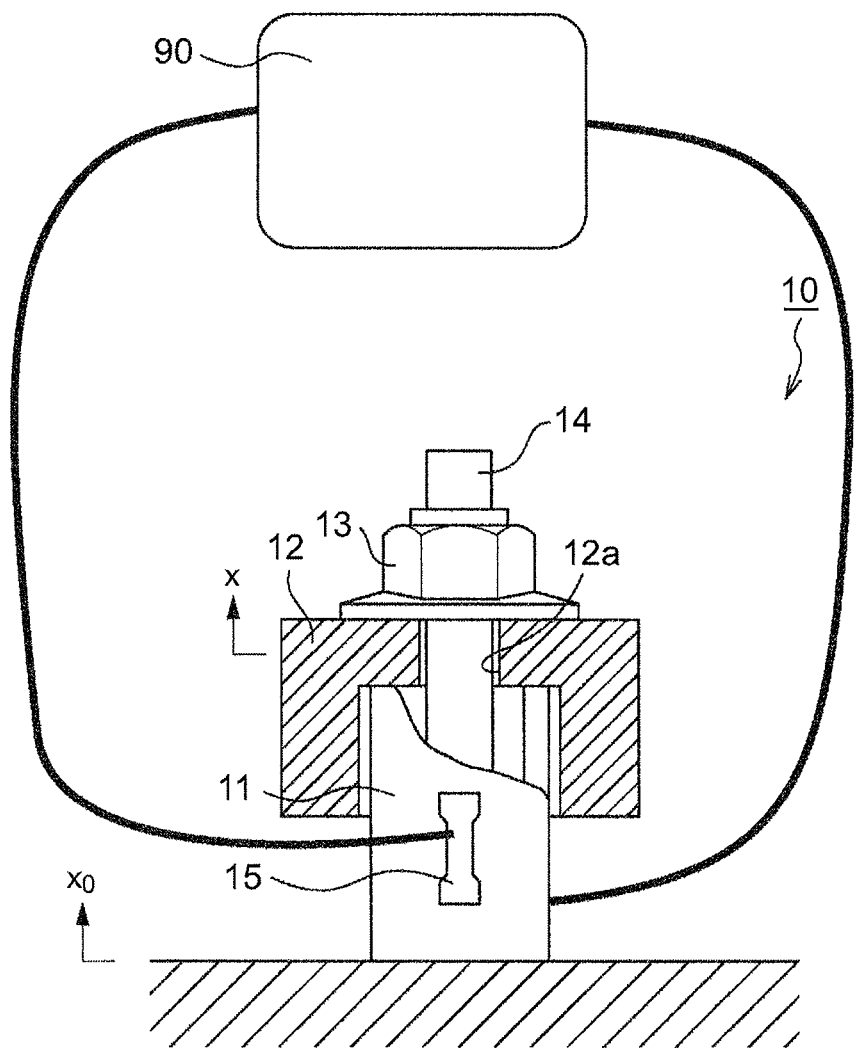
FIG. 10 is a diagram illustrating Embodiment 3 of the vibration reducing device of the present invention.

FIG. 10 is a diagram illustrating Embodiment 3 of the vibration reducing device of the present invention. While the vibration acceleration of inertial mass 12 is detected in the Embodiments 1 and 2, in the present embodiment, the relative displacement of the inertial mass with respect to the attachment point is detected.

In the present embodiment, strain gauge 15 for detecting the strain in the axial direction is bonded to the side surface of piezoelectric element 11. It is possible to determine the relative displacement from strain $\epsilon$ detected by strain gauge 15 according to the following Equation (12).

$$x - x_0 = \epsilon l \quad (12)$$

where, $\epsilon$: strain l: length of piezoelectric element

In the representation of the state space of the actuator movement in this case, strain $\epsilon$ is output, and the following equations (13-1), (13-2) are used for this representation.

$$\begin{bmatrix} \ddot{x} \\ \dot{x} \\ \dot{x}_0 \end{bmatrix} = \begin{bmatrix} -\frac{c}{m} & -\frac{k}{m} & 0 \\ 1 & 0 & 0 \\ 0 & 0 & -\frac{k}{c} \end{bmatrix} \begin{bmatrix} \dot{x} \\ x \\ x_0 \end{bmatrix} + \begin{bmatrix} \frac{1}{m} \\ 0 \\ 0 \end{bmatrix} u + \begin{bmatrix} \frac{1}{m} \\ 0 \\ \frac{1}{c} \end{bmatrix} w \quad (13\text{-}1)$$

$$\varepsilon = \begin{bmatrix} 0 & \frac{1}{l} & -\frac{1}{l} \end{bmatrix} \begin{bmatrix} \dot{x} \\ x \\ x_0 \end{bmatrix} + [0] u + [0] w \quad (13\text{-}2)$$

Just as in Embodiment 1, an observer is formed from this, and the velocity and displacement of the inertial mass, as well as the velocity and displacement of the attachment point, are determined. As a result, it is possible to perform the same control as in Embodiment 1 and Embodiment 2, and with the same effects.

Also, instead of the strain gauge, a displacement sensor can be used to measure the displacement directly.

Embodiment 4

Figure 11:
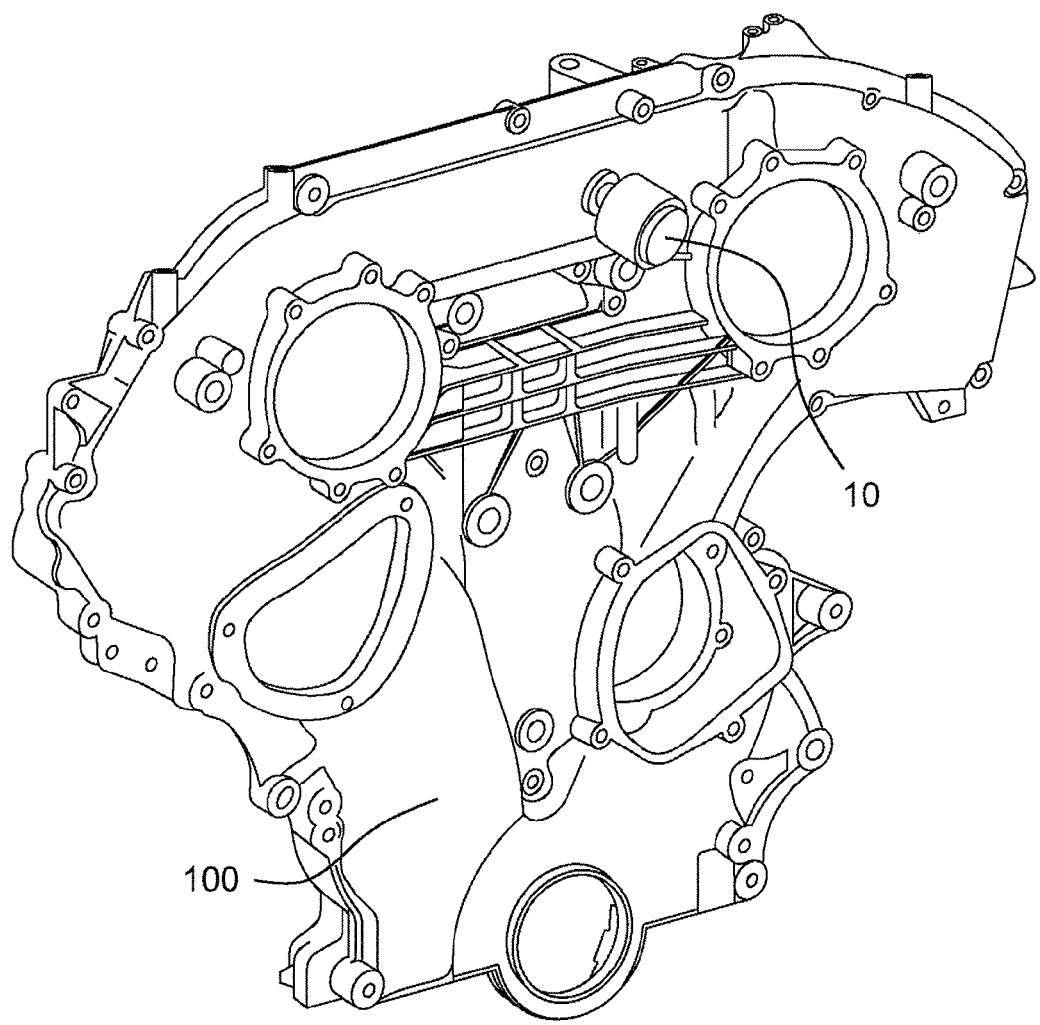
FIG. 11 is a diagram illustrating Embodiment 4, in which the vibration reducing device of the present invention is adopted for a chain case.

FIG. 11 is a diagram illustrating the state of application of the vibration reducing device of the present invention to chain case 100. Due to the vibration application force when the piston descends, the vibration application force input from the fuel injector, etc., the main body of the engine vibrates, and the vibration is transmitted to the radiating surface of chain case 100. The vibration is emitted as sound. Consequently, by reducing the vibration at the radiating surface, it is possible to reduce the engine noise. Here the engine noise is reduced by attaching inertial mass actuator 10 to chain case 100 to reduce the vibration of the chain case. Inertial mass actuator 10 is normally attached to the upper end of chain case 100 so that the vibration damping force acts in the normal direction of chain case 100. Inertial mass actuator 10 is controlled by controller 90.

In this embodiment, the inertial mass actuator is the same as that shown in FIG. 4 in Embodiment 1. The vibration acceleration signal (e.g. the vibration state of the inertial mass) of acceleration sensor 14, which detects the acceleration in the axial direction of inertial mass 12 and is integrally attached to inertial mass 12, is input to controller 90, and inertial mass actuator 10 is controlled based on this signal.

In the inertial mass actuator of the present invention there a model of the vibration characteristics of the vibration damping object is not needed in the controller. Only a model for the characteristics of the inertial mass actuator is needed. Consequently, even when the vibration damping object is changed, it is possible to realize the desired damping and rigidity improving effects by simply changing the gain by which the velocity and displacement of the attachment point are to be multiplied.

Inertial mass actuator 10 includes force generating element 11, inertial mass 12 and fastening bolt 13. The piezoelectric element 11, for example, is prepared by laminating thin sheet shaped piezoelectric elements. The piezoelectric element is polarized so that when a voltage is applied, an internal elongation force is generated in the z-direction that is nearly proportional to the applied voltage within the range of the applied voltage. That is, the piezoelectric element plays the role of a vibration damping force generating device that generates the elongation force in the axial direction (i.e. z-direction in FIG. 4) corresponding to the applied voltage. The force applied to chain case 100 by the piezoelectric element is given as a product of the vibration acceleration of inertial mass 12 and the mass of inertial mass 12.

The inertial mass 12 is mounted on piezoelectric element 11. Inertial mass 12 is formed as a cylinder with a cap, and hole 12a is formed in the cap. Inertial mass 12 surrounds a portion of piezoelectric element 11.

Fastening bolt 13 is inserted in hole 12a of inertial mass 12, and then through cylindrical piezoelectric element 11, and is screwed to chain case 100. Fastening bolt 13 screws piezoelectric element 11 and inertial mass 12 to chain case 100. Acceleration sensor 14 is attached to the upper end of fastening bolt 13. When fastening bolt 13 elongates corresponding to the displacement of inertial mass 12, that is, to the elongation of force generating element 11, acceleration sensor 14 detects the vibration acceleration in the axial direction (i.e. z-direction in FIG. 4).

In this manner, inertial mass actuator 10 performs vibration damping of chain case 100, with the reactive force to the vibration application force applied by force generating element (i.e. piezoelectric element) 11 to inertial mass 12 serving as the vibration damping force.

The scheme for forming a model of the inertial mass actuator and the idea of constructing the observer for determining the inertial mass velocity $\hat{\dot{x}}$, inertial mass displacement $\hat{x}$, attachment point velocity $\hat{\dot{x}}_0$, and attachment point displacement $\hat{x}_0$ are the same as in Embodiment 1.

Just as in Embodiment 1, in the present embodiment the attachment point velocity is multiplied by gain G1, and force $u_v$ with the opposite sign is input to chain case 100 as the control object, so that the resonance peak of vibration of chain case 100 is reduced.

Figure 12:
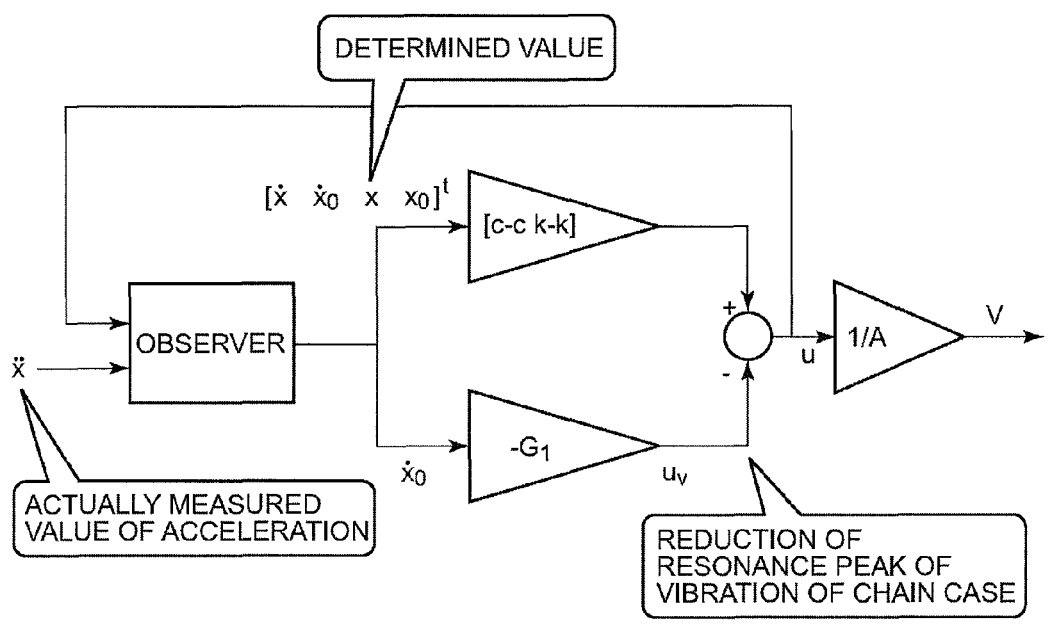
FIG. 12 is a block diagram illustrating control without considering the temperature dependence of the piezoelectric constant.

As shown in FIG. 12, input $u_v$ to chain case 100 determined by applying the attachment point velocity, determined by the observer based on the acceleration of the inertial mass detected by acceleration sensor 14 in Equation (7), and the velocity of the inertial mass determined by the observer, the velocity of the attachment point, the displacement of the inertial mass, and the displacement of the attachment point are applied in Equation (8) to determine control force u. Here, the driving signal is output by controller 90 so that control force u is generated by the actuator. Voltage V that is actually applied to drive force generating element 11 is represented by Equation (9).

However, it is well known that the characteristics of the force generating element vary due to temperature variations, etc. In this case, it is necessary to apply compensation to the relationship correlating the driving signal and elongation of the force generating element. The driving signal is computed based on the force conversion coefficient (e.g. piezoelectric constant in Embodiment 4) that corrects the relationship correlating the driving signal and elongation of the force generating element.

Figure 13:
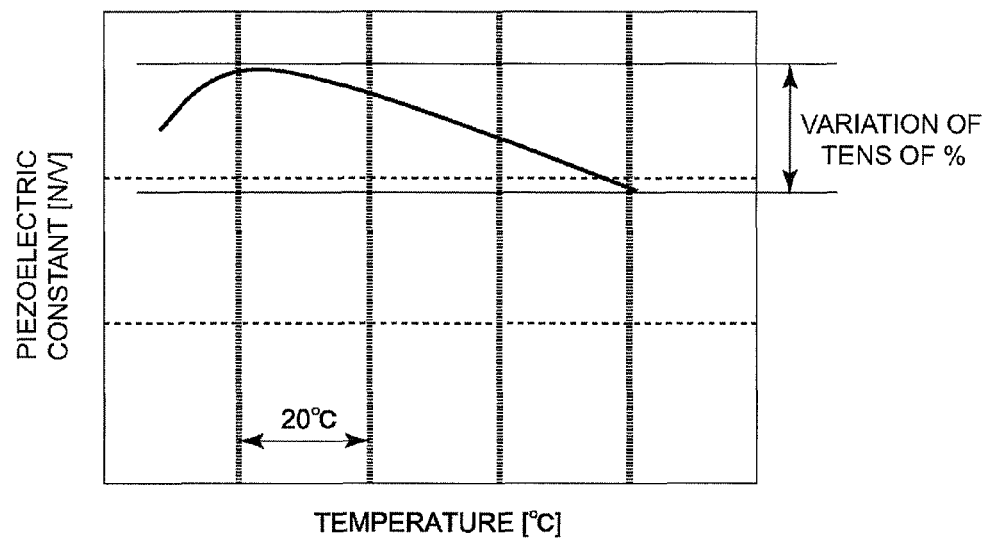
FIG. 13 is a diagram illustrating the influence of temperature variation on the characteristics (i.e. piezoelectric constant) of the force generating element.

FIG. 13 is a diagram illustrating the influence of temperature variation on the characteristics (e.g. force conversion coefficient) of the force generating element. When a piezoelectric element is used as the force generating element, the piezoelectric constant varies due to temperature variation as shown in FIG. 13.

Figure 14:
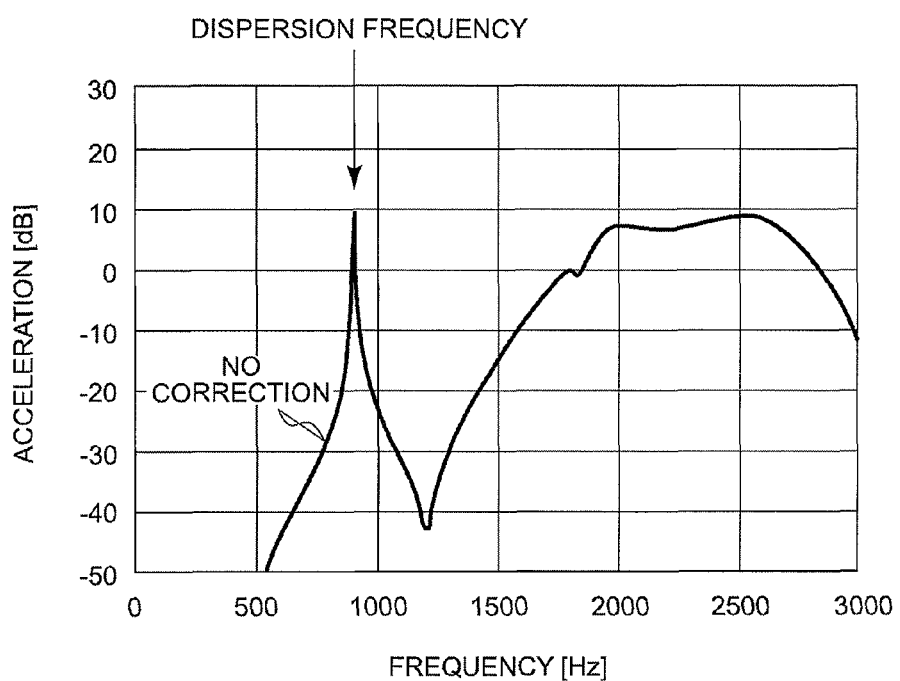
FIG. 14 is a diagram illustrating the problems resulting when control is performed without considering the temperature dependence of the piezoelectric constant.

FIG. 14 is a diagram illustrating the problems arising when control is performed without considering the temperature dependence of the piezoelectric constant. When control is performed without correction, that is, with the piezoelectric constant taken as a constant value at all times without considering its temperature dependence, although the piezoelectric constant actually varies with temperature variations, it might be possible that vibration is not reduced, but instead, divergence takes place, as shown in FIG. 14. For example, as shown in FIG. 14, divergence takes place near 900 Hz.

In this embodiment, without using a temperature sensor, the characteristics (e.g. force conversion coefficient) of the force generating element are identified in a prescribed operation state without performing vibration damping control. Here, by vibration damping control based on the detected characteristics, it is still possible to reduce the vibration without divergence even when the characteristics vary due to temperature variations or the like.

Figure 15:
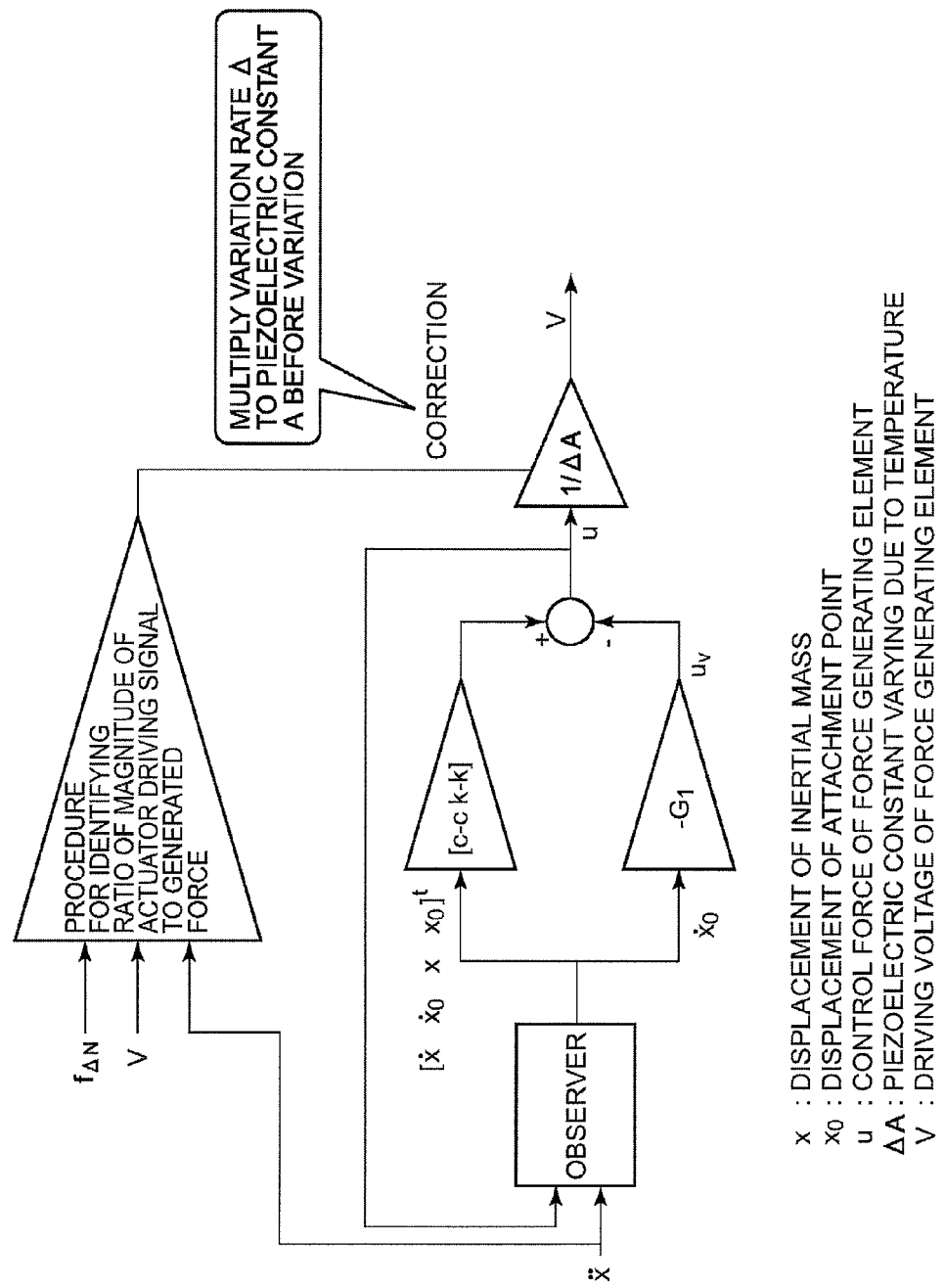
FIG. 15 is a block diagram illustrating control in Embodiment 4.

FIG. 15 is a block diagram illustrating control in the instant embodiment. Here, the piezoelectric constant identified in the prescribed operation state is used to correct driving voltage V, as shown in FIG. 15. The method for computing the variation rate (i.e. correction coefficient) Δ of the piezoelectric constant is explained below.

The natural vibration frequency $f_{AN}$ of the inertial mass actuator, computed based on the changed piezoelectric constant and the natural vibration frequency $f_N$ that is a reference determined beforehand, can be determined in Equation (14-7) according to the following equations (14-1)-(14-6).

A: Piezoelectric constant (piezoelectric constant before change)
Δ: Rate of variation due to the change in temperature or the like
ΔA: Piezoelectric constant that varies due to temperature changes or the like
$\tilde{x}_0$: Displacement of attachment point of inertial mass actuator computed based on the changed piezoelectric constant
$\tilde{x}_0 - \tilde{x}$: Relative displacement of laminated piezoelectric element computed based on the changed piezoelectric constant
$f_{AN}$: Natural vibration frequency of the inertial mass actuator computed based on the changed piezoelectric constant
$f_N$: Natural vibration frequency as a predetermined reference for the inertial mass actuator $$k(x_0 - x) = AV \tag{14-1}$$

$$k(\tilde{x}_0 - \tilde{x}) = \Delta AV \tag{14-2}$$

By means of equations (10-1), (10-2), the following equation is obtained:

$$\tilde{x}_0 = (\tilde{x}_0 - \tilde{x}) + x = \Delta x_0 + (1 - \Delta)x \tag{14-3}$$

The following equations are then derived:

$$m\ddot{x} + k(x - \tilde{x}_0) = 0 \tag{14-4}$$

$$m\ddot{x} + \Delta kx = \Delta kx_0 \tag{14-5}$$

$$\frac{x}{x_0} = \frac{\Delta k}{mS^2 + \Delta k} \tag{14-6}$$

Consequently, the following equation is obtained:

$$f_{\Delta N} = \sqrt{\Delta} \sqrt{\frac{k}{m}} = \sqrt{\Delta} f_N \tag{14-7}$$

Equation (14-7) makes it possible to compute the variation rate (i.e. correction coefficient) of the piezoelectric constant from natural vibration frequency $f_N$ as a predetermined reference, and natural vibration frequency $f_{\Delta N}$ computed based on the changed piezoelectric constant in the non-control mode. As shown in FIG. 15, it is possible to correct the variation by multiplying piezoelectric constant A before variation by this variation rate (i.e. correction coefficient) Δ.

That is, the piezoelectric elongates and generates a force proportional to the applied voltage. Conversely, it elongates proportional to an input from the outside and generates a voltage. Here, vibration damping control is not performed in the prescribed operation region, and the voltage is detected when an external input is applied to the force generating element. The natural vibration frequency $f_{\Delta N}$ of the inertial mass actuator is determined based on this voltage. It is then compared to natural vibration frequency $f_N$ as a predetermined reference for the inertial mass actuator to determine correction coefficient (i.e. variation rate) Δ. Then, by considering this correction coefficient Δ when actual vibration damping control is performed, it is still possible to obtain the vibration reducing effect even when there are effects from temperature variation, etc., and the piezoelectric constant varies.

In this way, according to the present embodiment, the characteristics of the force generating element without performing vibration damping control are identified in a prescribed operation state, so that there is no need to have a temperature sensor. The operation state for identifying the characteristics of the force generating element is explained as follows.

Figure 16:
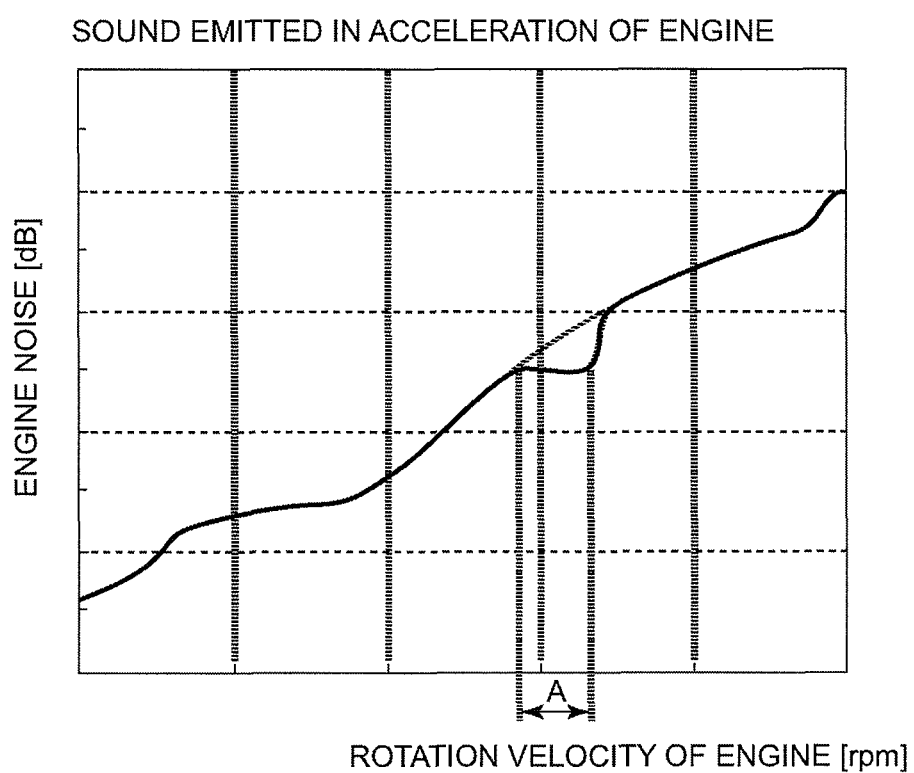
FIG. 16 is a diagram illustrating the relationship between the engine speed and the engine noise when the engine noise is reduced by reducing vibration of the chain case when the inertial mass actuator is used.

FIG. 16 is a diagram illustrating the relationship between the engine speed and the noise of the engine when the engine noise is reduced by reducing vibration of the chain case using the inertial mass actuator. As the engine speed rises, the engine noise also rises nearly proportionally. However, for example, in region A shown in FIG. 16, there may be no increase in the engine noise, or even a decrease in engine noise, when the engine speed rises. In the present embodiment, the characteristics of the force generating element are identified without the application of vibration damping control of the chain case by the inertial mass actuator.

If vibration damping control in region A is not performed, it is impossible to reduce the vibration of the chain case. Consequently, the engine noise increases, and as indicated by the shaded portion, the engine noise becomes higher.

Figure 17:
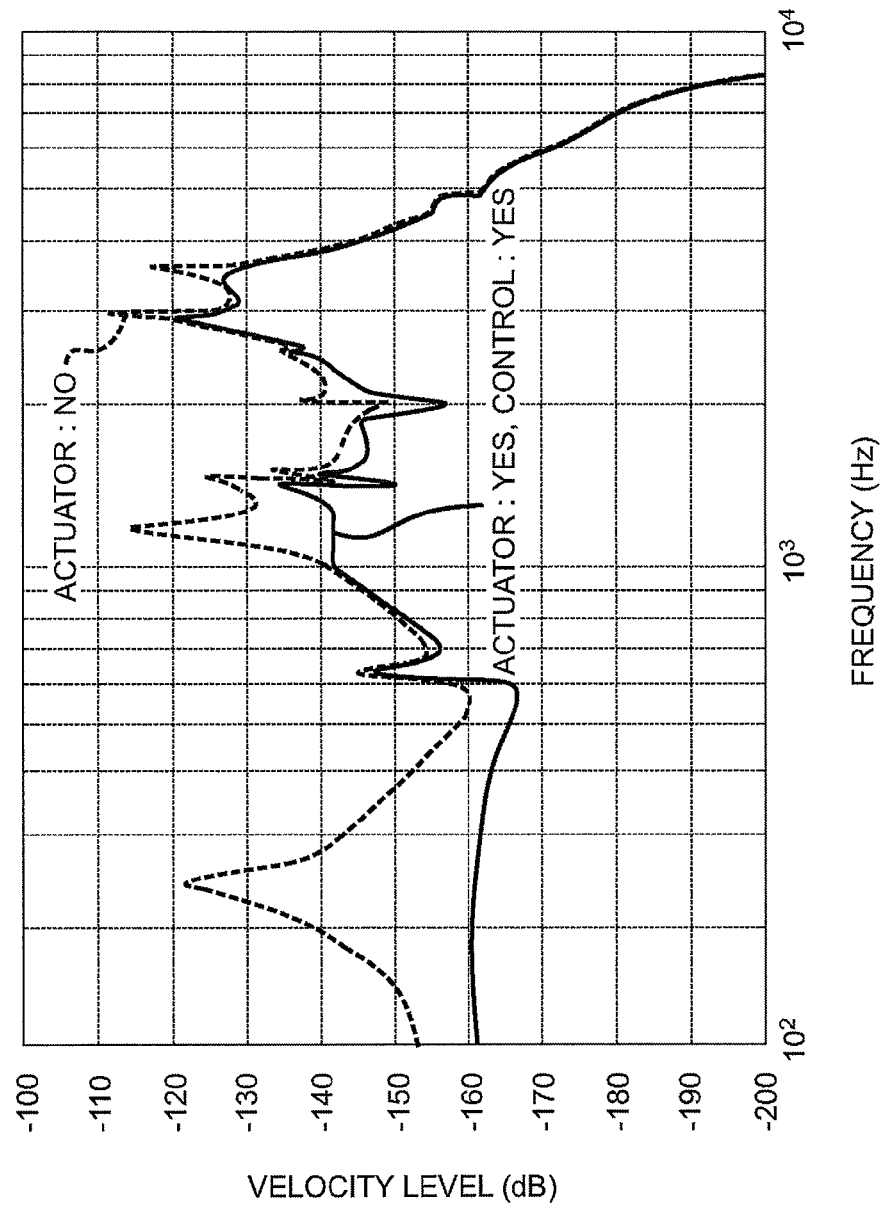
FIG. 17 is a diagram illustrating the vibration damping effect when the inertial mass actuator is used.

As a result, as shown in FIG. 17, it is possible to reduce the vibration of the chain case.

Figure 18:
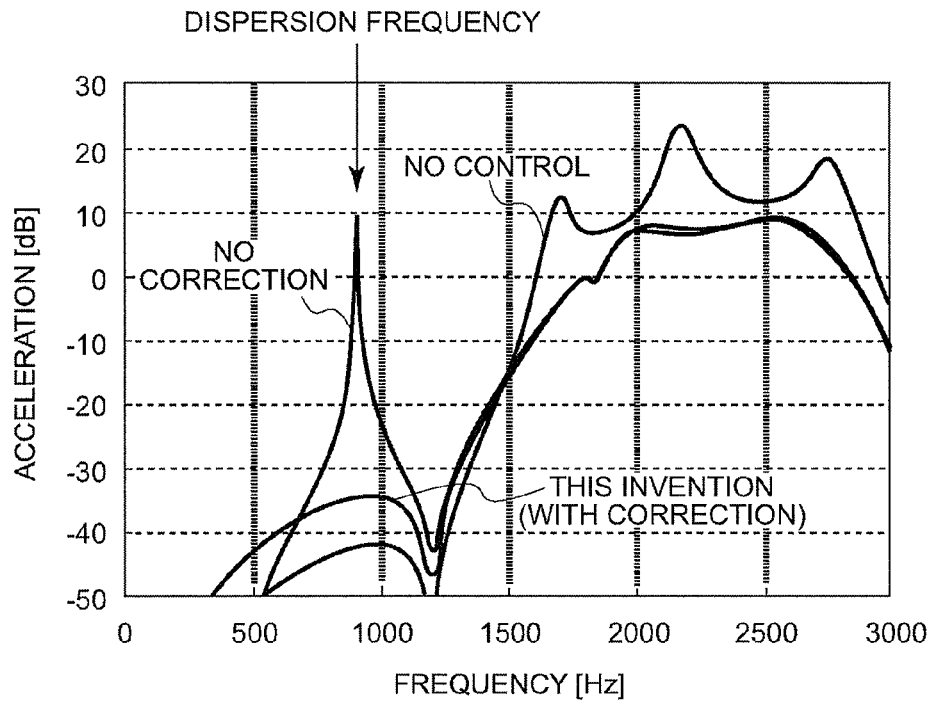
FIG. 18 is a diagram illustrating the vibration damping effect when the temperature dependence of the piezoelectric constant is considered.

Also, when the piezoelectric constant varies according to temperature variation, if the piezoelectric constant is taken as a constant value in the control without considering the temperature dependence of the piezoelectric constant, vibration cannot be reduced, and instead, divergence may occur, as shown in FIG. 14. However, as shown in FIG. 18, according to the embodiment, even when the piezoelectric constant varies due to variation in the temperature, etc., it is still possible to realize the vibration reduction effect at the principal resonance frequency of chain case vibration.

Also, when the inertial mass actuator is attached to the chain case but control according to the present invention is not performed, the vibration characteristics deteriorate due to resonance of the additive mass (i.e. inertial mass), and the resonance frequency of the chain case also falls. According to the present invention, however, because control is performed, the force transmitted to the chain case becomes only the force corresponding to the damping force in proportion to the velocity. As a result, it is free of the influence of the inertial mass actuator on the vibration system, and it is possible to prevent deterioration in the vibration characteristics due to resonance of the added mass and decrease in the resonance frequency of the chain case. Consequently, according to the present invention, there is no effect on the resonance frequency of the structure as would occur in the related art. Consequently, according to the present invention, since there is no influence on the resonance frequency of the structure as in the related art, there is still no need to perform re-tuning, even for a dynamic vibration absorber or the like, tuned together with the resonance frequency.

In addition, because an observer is used to determine the state quantities, it is possible to perform control with only one sensor, and since the order number of the observer is as low as $3^{rd}$, the load on the controller CPU also becomes lower.

Embodiment 5

Figure 19:
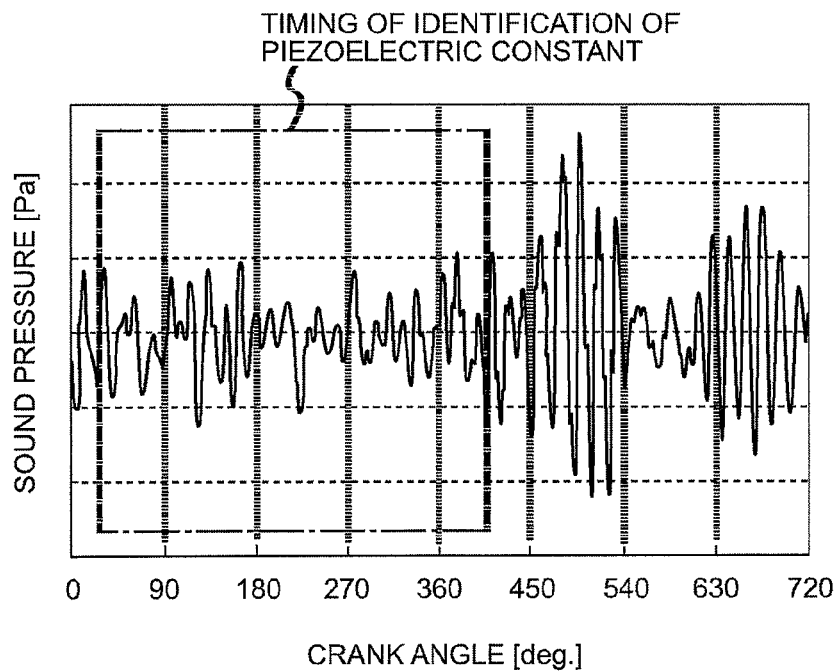
FIG. 19 is a diagram illustrating Embodiment 5 of the timing for identification of the piezoelectric constant of the inertial mass actuator of the present invention.

FIG. 19 is a diagram illustrating Embodiment 5 of the present invention. Embodiment 5 presents another example of the timing for determining the piezoelectric constant of the inertial mass actuator. In this embodiment, the same part numbers are adopted as in the above, and they will not be explained again.

When the relationship between the crank angle of the engine and the engine noise is checked, the engine noise drops periodically at prescribed crank angles during each cycle of the engine, as shown in FIG. 19. For example, the engine noise becomes lower at the crank angle of about 30-400 deg. It is believed that the reason for this may be that the level of vibration transmitted to the chain case varies due to the position in the cylinder where combustion takes place.

Here, a scheme can also be adopted in which vibration damping control is not performed by the inertial mass actuator in the operation region while the characteristics of the force generating element are being identified.

FIG. 19 shows an example only. The characteristics of the force generating element can also be identified by a map prepared beforehand for the operation region where the noise level becomes lower corresponding to the rotational velocity and the load on the engine (for example, for each engine type).

In this embodiment, the characteristics of the force generating element are identified in the operation region where the noise level becomes lower. During identification, vibration damping control cannot be performed, and the noise level deteriorates, but the level is not significantly different from the noise level in the remaining operation region, and the driver does not have an uneasy sensation.

Figure 20:
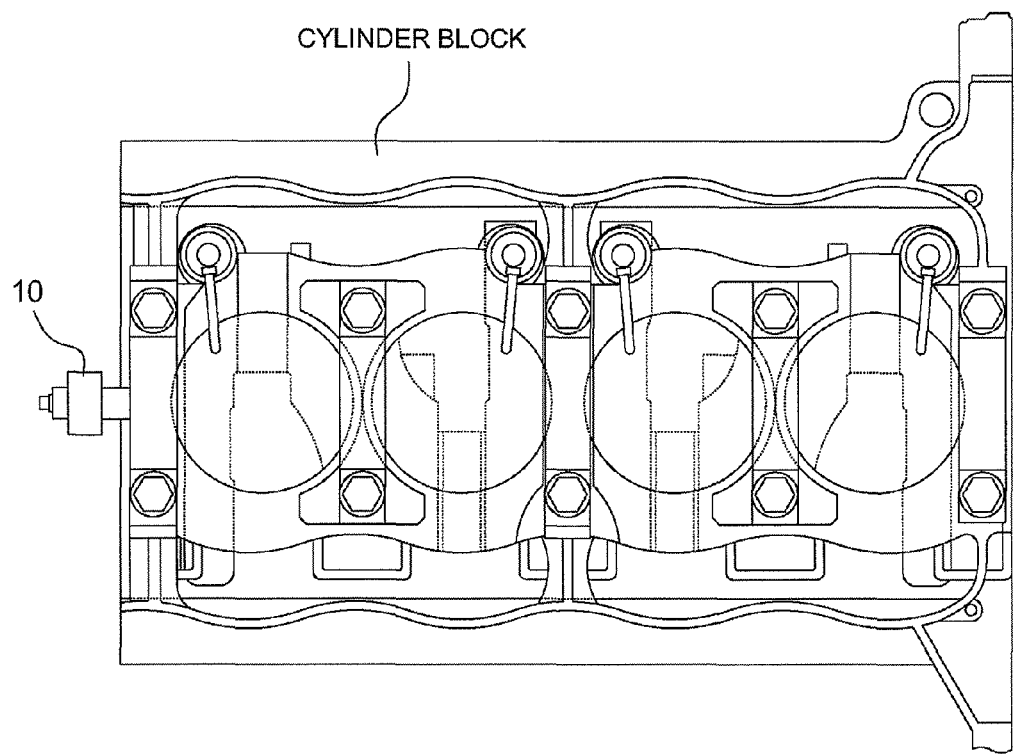
FIG. 20 is a diagram illustrating the state in which the inertial mass actuator is attached to the main bearing of the cylinder block.

While the invention has been disclosed with reference to certain preferred embodiments, numerous modifications, alterations, and changes to the described embodiments are possible without departing from the sphere and scope of the invention, as defined in the appended claims and equivalents thereof. For example, with the inertial mass actuator of the present invention, as explained above, even when the vibration damping object is changed, the desired vibration damping imparting effect and rigidity increasing effect can be realized by simply changing the gain by which the velocity and displacement of the attachment point are multiplied. Consequently, as shown in FIG. 20, the intertial mass actuator can also be attached to the main bearing of the cylinder block, for example, as the site where the vibration force is applied by the engine. Also, it can be attached on the rocker cover or oil pan as the site where the vibration force applied to the bearing is transmitted. By reducing vibration at these sites, too, it is possible to reduce the engine noise. In the above explanation, a piezoelectric element is taken as force generating element 11. However, a super-magnetostrictive element, for example, can also be used. While a piezoelectric element elongates in proportion to the voltage, a super-magnetostrictive element elongates in proportion to the magnetic field. That is, the magnetic field for the super-magnetostrictive element corresponds to the voltage for the piezoelectric element. Here, as the force conversion coefficient, a coefficient for correcting the relationship correlating the driving signal and elongation of the super-magnetostrictive element can be used. In this explanation, force conversion coefficient (i.e. variation rate) $\Delta$ is determined based on the natural vibration frequency (i.e. resonance frequency) of the inertial mass actuator. However, the present invention is not limited to this scheme. A scheme can also be adopted in which the force conversion coefficient (i.e. variation rate) $\Delta$ is determined based on the counter-resonance as the reciprocal of resonance. That is, the resonance characteristic values may include not only the natural vibration frequency (i.e. resonance frequency), but also the counter-resonance frequency. Accordingly, it is intended that the invention not be limited to the described embodiments, but that it have the full scope defined by the language of the following claims.

The invention claimed is:

1. A vibration reducing device for reducing vibration of a vibration damping object, comprising:
    an inertial mass actuator adapted to be mounted at a fixed location on the vibration damping object, the inertial mass actuator including a solid inertial mass having a fixed size and shape and a force generating element that causes the inertial mass to be displaced with respect to the vibration damping object by applying a vibration damping force on the vibration damping object, the vibration damping force being a reactive force generated due to displacement of the inertial mass;
    a vibration state detector contacting the inertial mass and configured to detect the vibration state of the inertial mass; and
    a controller connected to the inertial mass actuator and vibration state detector;
    wherein the controller is configured to determine the displacement and velocity of the vibration damping object at a part where the inertial mass actuator is mounted, and the displacement and velocity of the inertial mass, based on the vibration state of the inertial mass; and
    wherein the controller is configured to control the vibration damping force based on the determined displacement and velocity of the vibration damping object at the part where the inertial mass actuator is mounted, and the displacement and velocity of the inertial mass, by changing a length of the force generating element according to a driving signal; and
    wherein the controller is configured to compensate for temperature-driven changes in the relationship correlating the driving signal and an elongation force of the force generating element without using a temperature sensor, wherein the compensating comprises:
applying a predetermined force to the force generating element to generate a voltage;
determining a natural vibration frequency $f_{AN}$ from the voltage;
comparing the natural vibration frequency $f_{AN}$ to a predetermined reference $f_N$ to determine a force conversion coefficient $\Delta$; and
modifying the relationship correlating the driving signal and the elongation force of the force generating element based on the force conversion coefficient $\Delta$ by multiplying the force conversion coefficient $\Delta$ by a piezoelectric constant A to obtain a modified piezoelectric constant $\Delta A$.

2. The vibration reducing device according to claim 1, wherein the vibration state detector detects the vibration acceleration of the inertial mass as the vibration state of the inertial mass; and
wherein based on the vibration acceleration of the inertial mass and the vibration damping force, the controller determines the displacement and velocity of the vibration damping object at the part where the inertial mass actuator is mounted and the displacement and velocity of the inertial mass.

3. The vibration reducing device according to claim 1, wherein the vibration damping force has a component proportional to the relative displacement of the vibration damping object and the inertial mass at the part where the inertial mass actuator is mounted, and to the relative velocity of the vibration damping object and inertial mass at the part where the inertial mass actuator is mounted.

4. The vibration reducing device according to claim 3, wherein the vibration damping force has a component proportional to the velocity of the vibration damping object at the part where the inertial mass actuator is mounted.

5. The vibration reducing device according to claim 4, wherein the vibration damping force has a component proportional to the displacement of the vibration damping object at the part where the inertial mass actuator is mounted.

6. The vibration reducing device according to claim 5, wherein in the component proportional to the velocity and the displacement of the vibration damping object at the part where the inertial mass actuator is mounted, a low frequency component below a prescribed frequency is cut by a high-pass filter.

7. The vibration reducing device according to claim 1, wherein the vibration state detector detects the relative displacement of the vibration damping object and inertial mass at the part where the inertial mass actuator is mounted.

8. The vibration reducing device according to claim 1, wherein the controller identifies the force conversion coefficient $\Delta$ by equating the force conversation coefficient to the value: $f_{AN}^2/f_N^2$.

9. The vibration reducing device according to claim 1, wherein
the vibration damping object is a structural member of an engine; and
the controller identifies the force conversion coefficient when the engine speed is within a prescribed engine speed range wherein variation in the vibration noise is smaller with respect to variation in the engine speed than that at other engine speeds.

10. The vibration reducing device according to claim 1, wherein
the vibration damping object is a structural member of an engine; and
the controller identifies the force conversion coefficient when a crank angle is within a prescribed range of crank angles where the amplitude of vibration noise is lower than that at crank angles not within the prescribed range.

11. The vibration reducing device according to claim 1, wherein the force generating element is a piezoelectric element.

12. The vibration reducing device according to claim 1, wherein the force generating element is a super-magnetostrictive element.

13. A vibration reducing device for reducing vibration of a vibration damping object, comprising:
means for applying a vibration damping force at a fixed location on a vibration damping object, the vibration damping force being a reactive force generated due to displacement of a solid inertial mass having a fixed size and shape, the means for applying a vibration damping force including a force generating means;
means contacting the inertial mass for detecting a vibration state of the inertial mass; and
a controller for controlling the vibration reducing device, that determines the displacement and velocity of the vibration damping object at a part where the means for applying a vibration damping force is mounted to the vibration damping object, and that determines the displacement and velocity of the inertial mass, based on the vibration state of the inertial mass,
wherein the vibration damping force is controlled based on the determined displacement and velocity of the vibration damping object at the part where the means for applying a vibration damping force is mounted, and the displacement and velocity of the inertial mass, by changing a length of the force generating means according to a driving signal; and
wherein the driving signal compensates for temperature-driven changes in the relationship correlating the driving signal and an elongation force of the force generating means without using a temperature sensor, wherein the compensating comprises:
applying a predetermined force to the force generating element to generate a voltage;
determining a natural vibration frequency $f_{AN}$ from the voltage; comparing the natural vibration frequency $f_{AN}$ to a predetermined reference $f_N$ to determine a force conversion coefficient $\Delta$; and
modifying the relationship correlating the driving signal and the elongation force of the force generating element based on the force conversion coefficient $\Delta$ by multiplying the force conversion coefficient $\Delta$ by a piezoelectric constant A to obtain a modified piezoelectric constant $\Delta A$.

* * * * *